United States Patent
Patel et al.

(10) Patent No.: US 9,369,892 B2
(45) Date of Patent: Jun. 14, 2016

(54) OPERATION IN LIMITED SERVICE STATE

(71) Applicant: QUALCOMM Incorporated, San Diego, CA (US)

(72) Inventors: Harinath Reddy Patel, Hyderabad (IN); Ravi Kanth Kotreka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/190,831

(22) Filed: Feb. 26, 2014

(65) Prior Publication Data

US 2015/0245227 A1    Aug. 27, 2015

(51) Int. Cl.
*H04W 4/00* (2009.01)
*H04W 24/04* (2009.01)
*H04W 56/00* (2009.01)
*H04W 48/00* (2009.01)
*H04W 24/08* (2009.01)

(52) U.S. Cl.
CPC .............. *H04W 24/04* (2013.01); *H04W 48/00* (2013.01); *H04W 56/001* (2013.01); *H04W 24/08* (2013.01)

(58) Field of Classification Search
CPC .... H04W 24/04; H04W 24/08; H04W 56/001
USPC ............. 370/415, 263, 328; 455/434
See application file for complete search history.

(56) References Cited

U.S. PATENT DOCUMENTS

| | | | |
|---|---|---|---|
| 7,483,702 B2 * | 1/2009 | Yeo | H04W 36/0061 455/436 |
| 8,599,802 B2 | 12/2013 | Sammour et al. | |
| 2003/0227932 A1 * | 12/2003 | Meempat | H04L 49/101 370/415 |
| 2005/0254440 A1 * | 11/2005 | Sorrell | H04L 29/06027 370/264 |
| 2009/0275329 A1 * | 11/2009 | Sokondar | H04W 48/16 455/434 |
| 2011/0076964 A1 | 3/2011 | Dottling et al. | |
| 2011/0124312 A1 | 5/2011 | Kwon, II et al. | |
| 2013/0064176 A1 * | 3/2013 | Hsu | H04W 4/02 370/328 |
| 2013/0084855 A1 | 4/2013 | Ekici et al. | |

FOREIGN PATENT DOCUMENTS

| | | |
|---|---|---|
| EP | 2632205 A1 | 8/2013 |
| EP | 2658336 A1 | 10/2013 |
| EP | 2830245 A1 | 1/2015 |
| WO | 2013141558 A1 | 9/2013 |

OTHER PUBLICATIONS

3GPP TSG-S1#6: "Concept Proposal for EGPRS-136," UWCC, Revision 1.6, 3GPP TSG-S1#6, San Diego CA., USA, Nov. 29-Dec. 3, S1-(99)906, ETSI STC SMG2, Meeting #33, Nov. 22-26, 1999, 36 pages.

(Continued)

*Primary Examiner* — Charles Shedrick
(74) *Attorney, Agent, or Firm* — Austin Rapp & Hardman

(57) ABSTRACT

A method for wireless communication by a wireless communication device is described. The wireless communication device determines that the wireless communication device is in a limited service state. The wireless communication device camps on an available cell in response to the limited service state determination. The wireless communication device monitors a synchronization channel from the available cell at a reduced rate than a rate used for a full service state.

30 Claims, 6 Drawing Sheets

(56) References Cited

OTHER PUBLICATIONS

"3rd Generation Partnership Project; Technical Specification Group GSM/EDGE Radio Access Network; Functions related to Mobile Station (MS) in idle mode and group receive mode (Release 11)", 3GPP Standard; 3GPP TS 43.022, 3rd Generation Partnership Project (3GPP), Mobile Competence Centre; 650, Route Des Lucioles ; F-06921 Sophia-Antipolis Cedex; France, vol. GERAN WG1, No. V11.0.0, Sep. 18, 2012, pp. 1-24, XP050649438, [retrieved on Sep. 18, 2012].
International Search Report and Written Opinion—PCT/US2015/017334—ISA/EPO—May 11, 2015.

* cited by examiner

FIG. 4

OPERATION IN LIMITED SERVICE STATE

TECHNICAL FIELD

The present disclosure relates generally to wireless devices for communication systems. More specifically, the present disclosure relates to systems and methods for operation in a limited service state.

BACKGROUND

Wireless communication systems are widely deployed to provide various types of communication content such as voice, video, data and so on. These systems may be multiple-access systems capable of supporting simultaneous communication of multiple mobile devices with one or more base stations.

Mobile devices such as cell phones have become a part of everyday life. Mobile devices are typically battery operated. It may be desirable for a mobile device to maximize battery life. Because an electronic device often runs on a battery with a limited operation time, reductions in the power consumption of an electronic device may increase the desirability and functionality of the electronic device.

Mobile devices are continuing to be used for placing emergency calls. Because of their use in placing emergency calls, it is particularly important to maximize battery power, especially in low service areas where searching for networks can quickly drain the battery life of a mobile device. Benefits may be realized by improvements to mobile devices that maximize the battery life of these mobile devices.

SUMMARY

A method for wireless communication by a wireless communication device is described. It is determined that the wireless communication device is in a limited service state. The wireless communication device camps on an available cell in response to the limited service state determination. A synchronization channel from the available cell is monitored at a reduced rate than a rate used for a full service state.

The synchronization channel may be a Global Systems for Mobile Communications SCH channel. The wireless communication device may refrain from monitoring a paging channel while in the limited service state. The reduced rate may be based on a battery power level of the wireless communication device or on a network of the available cell. Monitoring the synchronization channel may include receiving a single burst of the synchronization channel.

A system information timer may be started. Select system information may be refreshed each time the system information timer expires. The system information timer may be a 30 second Third Generation Partnership Project timer. Refreshing the select system information may ensure that cell selection parameters have not changed. Monitoring the synchronization channel may allow the wireless communication device to initiate emergency calls.

An apparatus for wireless communication is also described. The apparatus includes a processor, memory in electronic communication with the processor and instructions stored in the memory. The instructions are executable by the processor to determine that the apparatus is in a limited service state. The instructions are also executable by the processor to camp on an available cell in response to the limited service state determination. The instructions are further executable by the processor to monitor a synchronization channel from the available cell at a reduced rate than a rate used for a full service state.

An apparatus for operating in a limited service state is described. The apparatus includes means for determining that the wireless communication device is in the limited service state. The apparatus also includes means for camping on an available cell in response to the limited service state determination. The apparatus further includes means for monitoring a synchronization channel from the available channel at a reduced rate than a rate used for a full service state.

A computer-program product for wireless communications is also described. The computer-program product includes a non-transitory computer-readable medium having instructions thereon. The instructions include code for causing a wireless communication device to determine that the apparatus is in a limited service state. The instructions also include code for causing the wireless communication device to camp on an available cell in response to the limited service state determination. The instructions further include code for causing the wireless communication device to monitor a synchronization channel from the available cell at a reduced rate than a rate used for a full service state.

BRIEF DESCRIPTION OF THE DRAWINGS

FIG. 4 is a block diagram illustrating the radio blocks read by a wireless communication device;

DETAILED DESCRIPTION

Figure 1:
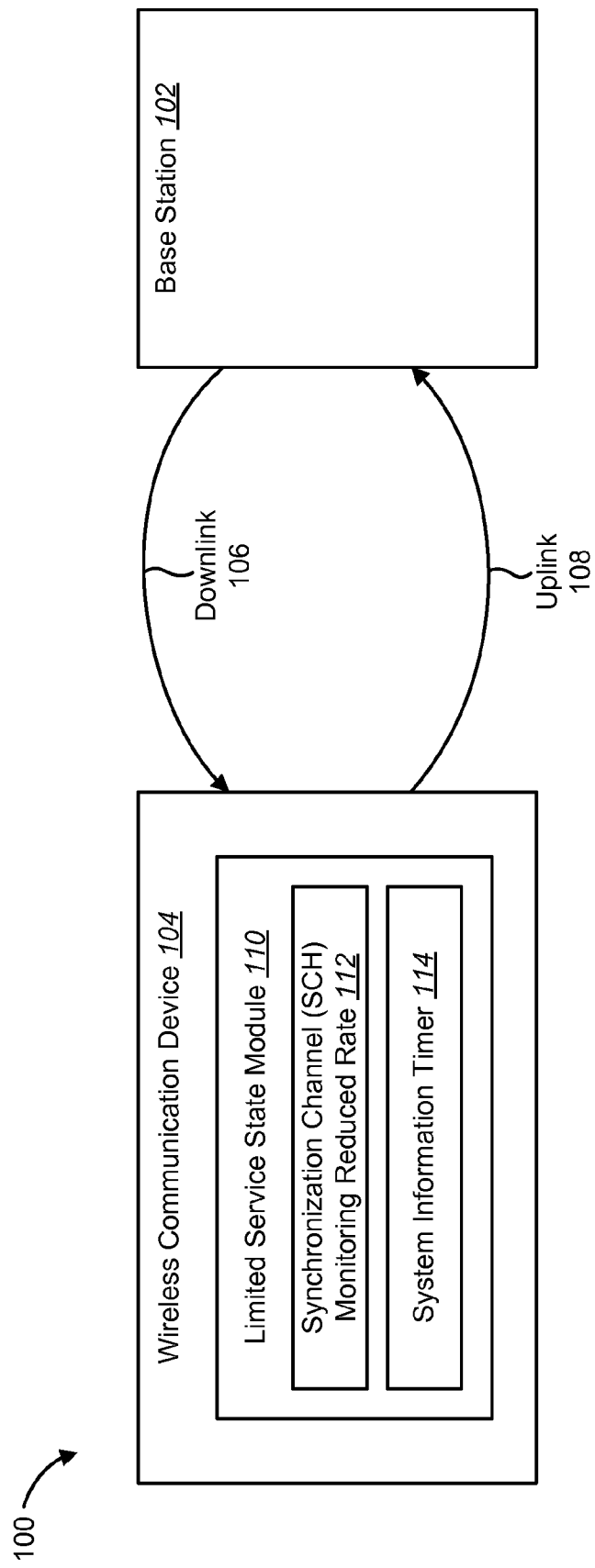
FIG. 1 shows a wireless communication system for use in the present systems and methods.

FIG. 1 shows a wireless communication system 100 for use in the present systems and methods. Wireless communication systems 100 are widely deployed to provide various types of communication content such as voice, data and so on. The wireless communication system 100 may include multiple wireless devices. A wireless device may be a base station 102 or a wireless communication device 104. The wireless communication device 104 may be configured for operation in a limited service state. A wireless communication device 104 may operate in one of three service states: a full service state, a limited service state and a no service state. In a full service state, a wireless communication device 104 may access all the features available for a particular cell. In a no service state, a wireless communication device 104 cannot access any features of a cell.

A limited service state occurs when a wireless communication device 104 cannot find a suitable cell but has some limited form of coverage from non-suitable cells (e.g., cells that the wireless communication device 104 is not registered with or cells with minimum communication standards not being met by the wireless communication device 104). In a limited service state, the wireless communication device 104 is unable to connect to either a home network or a roaming network. The wireless communication device 104 may include a limited service state module 110 that allows the wireless communication device 104 to conserve battery power while in a limited service state while maintaining the ability to initiate emergency calls.

A base station 102 is a station that communicates with one or more wireless communication devices 104. A base station 102 may also be referred to as, and may include some or all of the functionality of, an access point, a base transceiver station (BTS), a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area, depending on the context in which the term is used.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (WCDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes WCDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, an entertainment device, a wearable device, a television, a computing device, and many other types of devices capable of wireless communication.

A wireless communication device 104 may communicate with zero, one or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS) and EDGE (Enhanced Data rates for GSM Evolution) standards have been adopted in GSM systems. In the GSM/EDGE Radio Access Network (GERAN) specification, GPRS and enhanced general packet radio service (EGPRS) provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, a GSM network may use the GSM-850 band, the EGSM band (also referred to as the E-GSM-900 band), the DCS (digital cellular service) band (also referred to as DCS-1800), the PCS (personal communications service) band (also referred to as PCS-1900), the P-GSM band, the R-GSM band and the T-GSM band.

As discussed above, the wireless communication device 104 may include a limited service state module 110. The limited service state module 110 may allow the wireless communication device 104 to remain in sync with a network while conserving battery power during a limited service state.

There are a number of situations where a wireless communication device 104 is unable to obtain normal service from a public land mobile network (PLMN) and is instead in a limited service state (also referred to as a no suitable cell state). For example, a wireless communication device 104 may enter a limited service state if the wireless communication device 104 fails to find a suitable cell of the selected PLMN (i.e., when no PLMNs are available and allowable for use) or if the wireless communication device 104 does not include a valid subscriber identity module (SIM) card. A wireless communication device 104 may also enter a limited service state if a location request (LR) results in a "GPRS not allowed" response.

When in the limited service state, a wireless communication device 104 will attempt to camp on an acceptable cell so that emergency calls can be made. However, the 3GPP specification does not provide clear guidelines on what the expectations are for the wireless communication device 104 while in this limited service state. For example, the wireless communication device 104 must be in sync with the network in order to initiate an emergency call (as otherwise the call may not go through). The current 3GPP specification does not provide guidelines as to how the wireless communication device 104 should remain in sync with the network.

The limited service state module 110 allows the wireless communication device 104 to remain in sync with the network in a limited service state without monitoring the paging channel (PCH). The limited service state module may provide particular benefits when used on a wireless communication device configured with multi-SIM standby/active devices.

The limited service state module 110 may include a synchronization channel (SCH) monitoring reduced rate 112. The wireless communication device 104 may monitor the synchronization channel (SCH) at the synchronization channel (SCH) monitoring reduced rate 112, thereby only needing to periodically decode a single burst of the synchronization channel (SCH) (or other reference signal from the network) to maintain synchronization with the network. The synchronization channel (SCH) monitoring reduced rate 112 may be transmitted from the network to the wireless communication device 104 or the synchronization channel (SCH) monitoring reduced rate 112 may be stored on the wireless communication device 104. In one configuration, the synchronization channel (SCH) monitoring reduced rate 112 may be adjusted based on the synchronization needed for a specific network and/or based on the battery power of the wireless communication device. For example, a wireless communication device 104 with full battery power may use a higher synchronization channel (SCH) monitoring reduced rate 112 than a wireless communication device 104 with low battery power.

By sparingly monitoring the synchronization channel (SCH) for synchronization information, the wireless communication device 104 may experience significantly reduced power consumption while in limited service state. Because the synchronization channel (SCH) has a duration that is much shorter (one frame) than the duration of the paging channel (PCH) (four frames), the wireless communication device 104 can remain synchronized with the network using less resources by only monitoring the synchronization channel (SCH) (and not the paging channel (PCH)).

In one configuration, the synchronization channel (SCH) may be decoded between a minimum rate and a maximum rate. The minimum rate may be 2×51 multiframe duration=470 milliseconds (ms). The maximum rate may be 9×51 multiframe duration=2115 ms. The granularity between the minimum rate and the maximum rate may be 1 multiframe. 1 multiframe=~235 ms. In one configuration, the rate of decoding the synchronization channel (SCH) may be comparable to the paging channel (PCH) decode rate commanded by the network using the BS_PA_MFRMS parameter. In another configuration, the rate of decoding the synchronization channel (SCH) may be based on the available battery power of the wireless communication device 104. When the maximum rate is used for decoding the synchronization channel (SCH), the battery savings will be greater than when the minimum rate is used.

The limited service state module 110 may also include a system information timer 114. The system information timer 114 may allow the wireless communication device 104 to periodically refresh select System Information (SI). For example, each time the system information timer 114 expires, the wireless communication device 104 may refresh select System Information (SI) with the network. In one configuration, the system information timer 114 may be the 30 second 3GPP timer.

Figure 2:
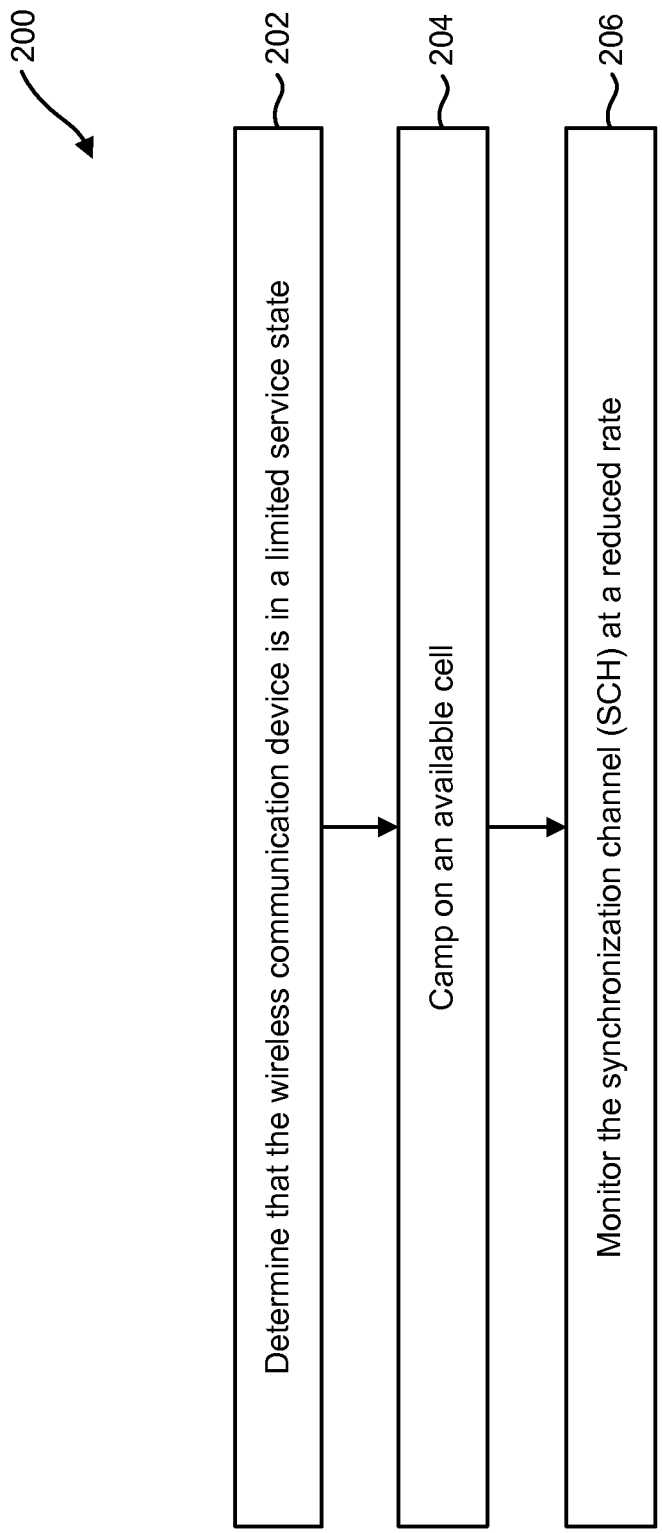
FIG. 2 is a flow diagram of a method for operation in a limited service state.

FIG. 2 is a flow diagram of a method 200 for operation in a limited service state. The method 200 may be performed by a wireless communication device 104 that includes a limited service state module 110. The wireless communication device 104 may determine 202 that the wireless communication device 104 is in a limited service state. In one configuration, the wireless communication device 104 may determine 202 that the wireless communication 104 is in a limited service state by failing to find a suitable cell.

In another configuration, the wireless communication device 104 may determine 202 that the wireless communication device 104 is in a limited service state by detecting that no SIM card (or an invalid SIM card) is inserted in the wireless communication device 104. In yet another configuration, the wireless communication device 104 may determine 202 that the wireless communication device 104 is in a limited service state by receiving an indication from the network (e.g., from a base station 102) that the wireless communication device 104 is in a limited service state. For example, the wireless communication device 104 may receive an "illegal MS," "illegal ME" or "IMSI unknown in HLR" response to a location request (LR).

Once the wireless communication device 104 has determined 202 that the wireless communication device 104 is in a limited service state, the wireless communication device 104 may camp 204 on an available cell. The wireless communication device 104 may attempt to camp 204 on an acceptable cell, irrespective of the PLMN identity of the cell. The wireless communication device 104 may monitor 206 the synchronization channel (SCH) of the available cell at a reduced rate. For example, the wireless communication device 104 may monitor 206 the synchronization channel (SCH) at a synchronization channel (SCH) monitoring reduced rate 112.

The synchronization channel (SCH) may include information corresponding to a public land mobile network (PLMN) search and registration necessary for the wireless communication device 104 to start a call or camp on a serving cell. The synchronization channel (SCH) may also include information that allows the wireless communication device 104 to remain synchronized with the network.

Figure 3:
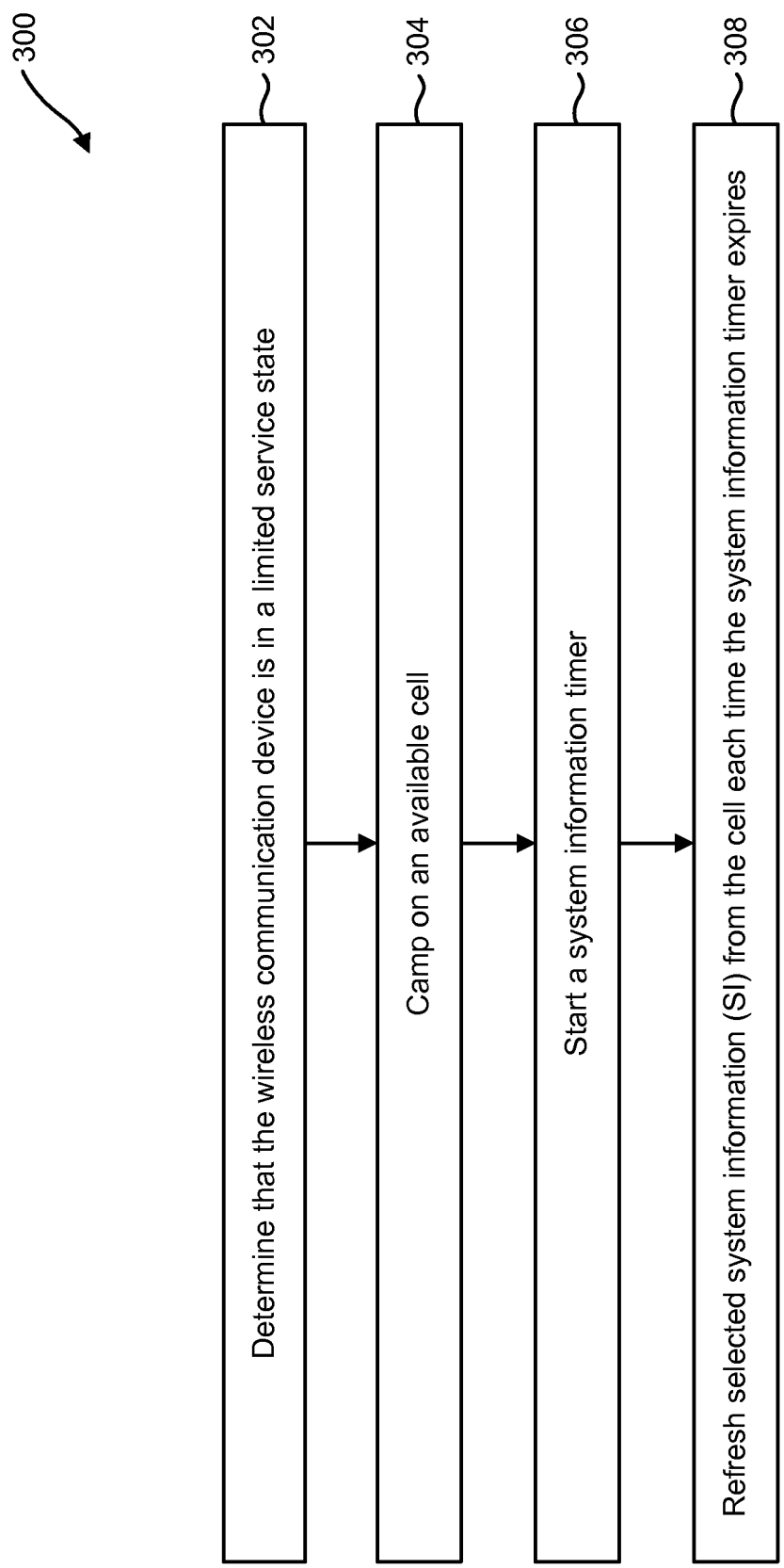
FIG. 3 is a flow diagram of another method for operation in a limited service state.

FIG. 3 is a flow diagram of another method 300 for operation in a limited service state. The method 300 may be performed by a wireless communication device 104 that includes a limited service state module 110. The wireless communication device 104 may determine 302 that the wireless communication device 104 is in a limited service state. The wireless communication device 104 may then camp 304 on an available cell.

The wireless communication device 104 may start 306 a system information timer 114. In one configuration, the system information timer 114 may be the 3GPP 30 second timer. Each time that the system information timer 114 expires, the wireless communication device 104 may refresh 308 selected system information (SI) from the cell. Refreshing 308 selected system information (SI) may ensure that cell selection or cell reselection parameters have not changed. Refreshing 308 selected system information (SI) may also ensure that the wireless communication device 104 determines when the service state goes from a limited service state to a full service state. The system information (SI) that is refreshed may be determined by the network. When the system information timer 114 expires, the wireless communication device 104 receives the SI change information in a system information type 13 (SI13) message.

Figure 4:
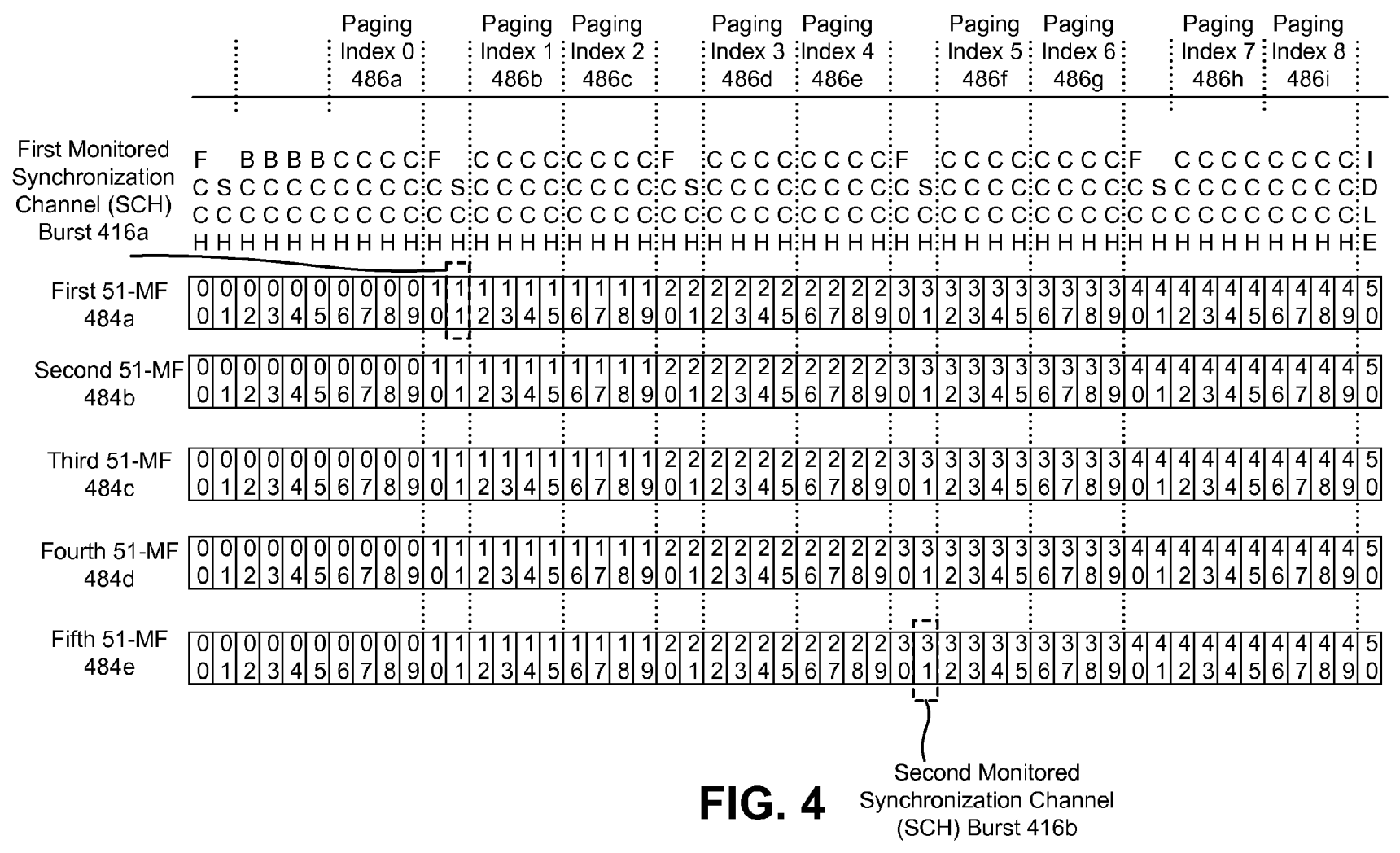

FIG. 4 is a block diagram illustrating the radio blocks read by a wireless communication device 104. Each 51-multiframe (MF) 484*a-e* may have 51 frames (see 3GPP TS 45.002). Each 51-multiframe (MF) 484 may be numbered in order from 00 to 50. While five 51-multiframes (MFs) 484*a-e* are illustrated, it should be appreciated that as few as one and as many as n may be employed, where n represents an integer value. For example, 12, 35, 80, or 104 multiframes (MFs) may be employed in each cycle.

Different channels may be associated with each frame. For example, the frequency correction channel (FCCH) may associate with frames 00, 10, 30, and 40. The synchronization channel (SCH) may associate with frames 01, 11, 21, 31, and 41. The broadcast control channel (BCCH norm) may associate with frames 02, 03, 04, and 05. In some configurations, the optional broadcast control channel (BCCH ext) may associate with frames 06, 07, 08, and 09 (not shown).

In addition, the frames may be associated with a paging index 486. There may be nine paging indexes 486*a-i* associated with each 51-multiframe (MF) 484*a-e* (The nine paging indexes are in addition to the first BCCH block).

A wireless communication device 104 operating in a limited service state may monitor the synchronization channel (SCH) at a synchronization channel (SCH) monitoring reduced rate 112. The synchronization channel (SCH) monitoring reduced rate 112 may be less frequent than the synchronization channel (SCH) monitoring rate of a wireless communication device 104 in a full service state. In the example illustrated, the wireless communication device 104 monitors a first monitored synchronization channel (SCH) burst 416*a* in frame 11 of the first 51-multiframe (MF) 484*a*. The wireless communication device 104 then skips monitoring the synchronization channel (SCH) until the second monitored synchronization channel (SCH) burst 416*b* in frame 31 of the fifth 51-multiframe (MF) 484*e*. During this time, the wireless communication device 104 may avoid monitoring the paging channel (PCH).

Figure 5:
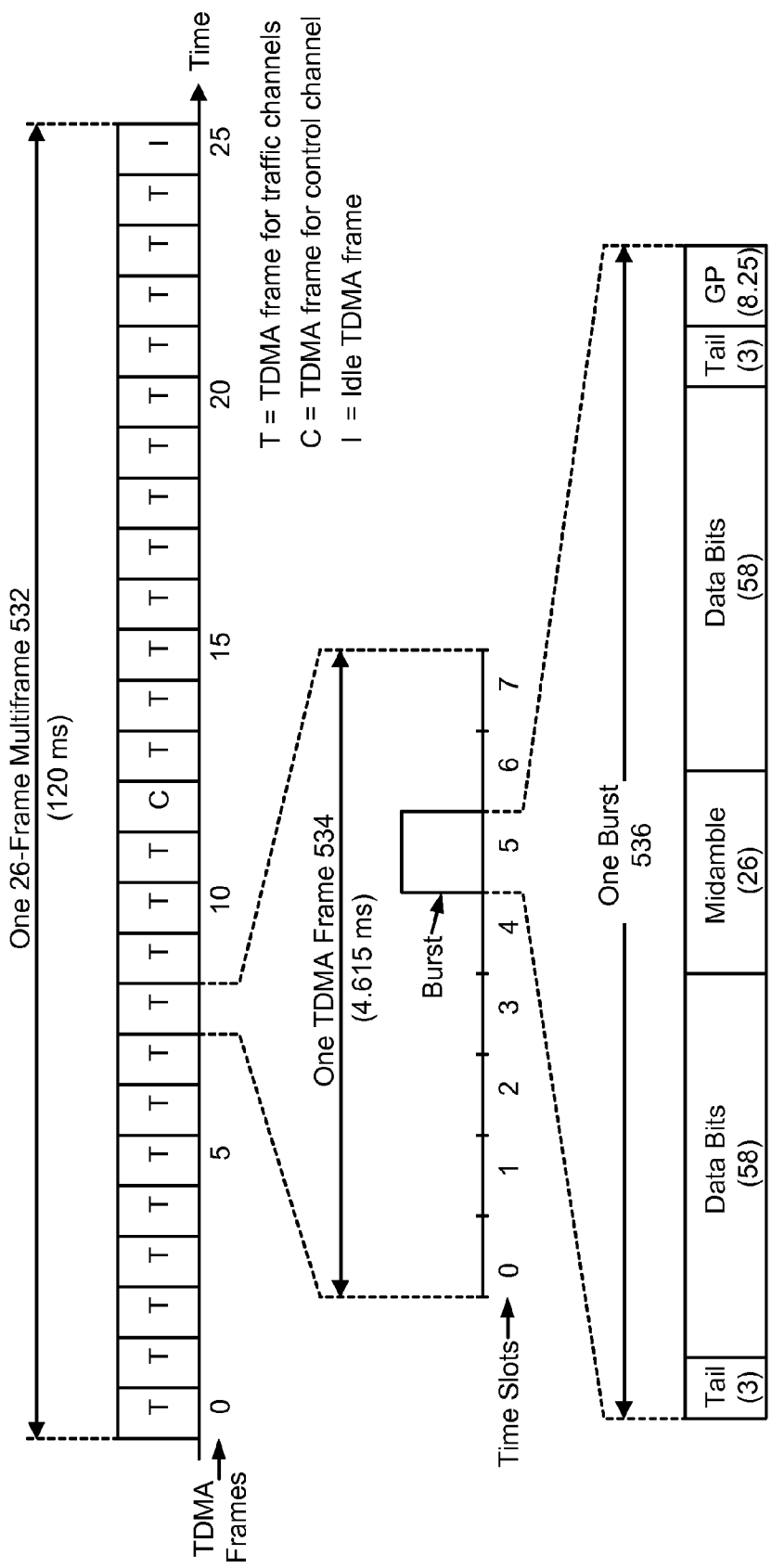
FIG. 5 shows example frame and burst formats in GSM.

FIG. 5 shows example frame and burst formats in GSM. The timeline for transmission is divided into multiframes 532. For traffic channels used to transmit user-specific data, each multiframe 532 in this example includes 26 TDMA frames 534, which are labeled as TDMA frames 0 through 25. The traffic channels, in this example, are sent in TDMA frames 0 through 11 and TDMA frames 13 through 24 of each multiframe 532 (other mappings are possible using half-rate channels or Voice services over Adaptive Multi-user channels on One Slot (VAMOS)). A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 536 in GSM. Each burst 536, in this example, includes two tail fields, two data fields, a training sequence (or midamble) field and a guard period (GP). The number of symbols in each field is shown inside the parentheses. A burst 536 includes symbols for the tail, data, and midamble fields. No symbols are sent in the guard period. TDMA frames of a particular carrier frequency are numbered and formed in groups of 26 or 51 TDMA frames 534 called multiframes 532.

Figure 6:
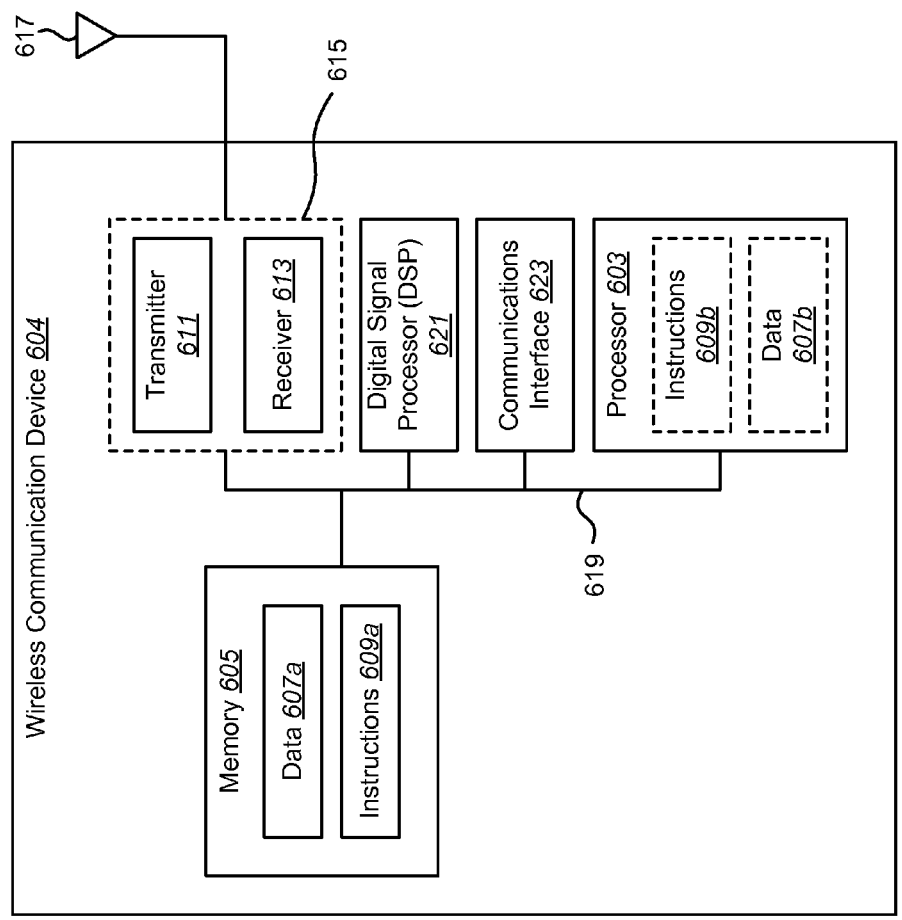
FIG. 6 illustrates certain components that may be included within a wireless communication device.

FIG. 6 illustrates certain components that may be included within a wireless communication device 604 according to some embodiments. The wireless communication device 604 of FIG. 6 may be one configuration of the wireless communication device 104 of FIG. 1. The wireless communication device 604 may be an access terminal, a mobile station, a user equipment (UE), etc. The wireless communication device 604 includes a processor 603. The processor 603 may be a general purpose single- or multi-chip microprocessor (e.g., an ARM), a special purpose microprocessor (e.g., a digital signal processor (DSP)), a microcontroller, a programmable gate array, etc. The processor 603 may be referred to as a central processing unit (CPU). Although just a single processor 603 is shown in the wireless communication device 604 of FIG. 6, in an alternative configuration a combination of processors (e.g., an ARM and DSP) could be used.

The wireless communication device 604 also includes memory 605. The memory 605 may be any electronic component capable of storing electronic information. The memory 605 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 607*a* and instructions 609*a* may be stored in the memory 605. The instructions 609*a* may be executable by the processor 603 to implement the methods disclosed herein. Executing the instructions 609*a* may involve the use of the data 607*a* that is stored in the memory 605. When the processor 603 executes the instructions 609, various portions of the instructions 609*b* may be loaded onto the processor 603, and various pieces of data 607*b* may be loaded onto the processor 603. In one configuration, the processor 603 may include the limited service state module 110 discussed above.

The wireless communication device 604 may also include a transmitter 611 and a receiver 613 to allow transmission and reception of signals to and from the wireless communication device 604 via an antenna 617. The transmitter 611 and receiver 613 may be collectively referred to as a transceiver 615. The wireless communication device 604 may also include (not shown) multiple transmitters, multiple antennas, multiple receivers and/or multiple transceivers.

The wireless communication device 604 may include a digital signal processor (DSP) 621. The wireless communication device 604 may also include a communications interface 623. The communications interface 623 may allow a user to interact with the wireless communication device 604.

The various components of the wireless communication device 604 may be coupled together by one or more buses, which may include a power bus, a control signal bus, a status signal bus, a data bus, etc. For the sake of clarity, the various buses are illustrated in FIG. 6 as a bus system 619.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized. For example, some of the methods described herein may be performed by a processor 603, software and/or firmware.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for wireless communication by a wireless communication device, comprising:
   determining that the wireless communication device is in a limited service state;
   camping on an available cell in response to the limited service state determination; and
   monitoring a synchronization channel from the available cell at a reduced rate than a rate used for a full service state.

2. The method of claim 1, wherein the synchronization channel is a Global Systems for Mobile Communications SCH channel.

3. The method of claim 1, further comprising refraining from monitoring a paging channel while in the limited service state.

4. The method of claim 1, wherein the reduced rate is based on a battery power level of the wireless communication device.

5. The method of claim 1, wherein the reduced rate is based on a network of the available cell.

6. The method of claim 1, wherein monitoring the synchronization channel comprises receiving a single burst of the synchronization channel.

7. The method of claim 1, further comprising:
   starting a system information timer; and
   refreshing select system information from the available cell each time the system information timer expires.

8. The method of claim 7, wherein the system information timer is a 30 second Third Generation Partnership Project timer.

9. The method of claim 7, wherein refreshing the select system information ensures that cell selection parameters have not changed.

10. The method of claim 1, wherein monitoring the synchronization channel allows the wireless communication device to initiate emergency calls.

11. An apparatus for wireless communication, comprising:
    a processor;
    memory in electronic communication with the processor; and
    instructions stored in the memory, the instructions being executable by the processor to:
      determine that the apparatus is in a limited service state;
      camp on an available cell in response to the limited service state determination; and
      monitor a synchronization channel from the available cell at a reduced rate than a rate used for a full service state.

12. The apparatus of claim 11, wherein the synchronization channel is a Global Systems for Mobile Communications SCH channel.

13. The apparatus of claim 11, wherein the apparatus refrains from monitoring a paging channel while in the limited service state.

14. The apparatus of claim 11, wherein the reduced rate is based on a battery power level of the apparatus.

15. The apparatus of claim 11, wherein the reduced rate is based on a network of the available cell.

16. The apparatus of claim 11, wherein monitoring the synchronization channel comprises receiving a single burst of the synchronization channel.

17. The apparatus of claim 11, wherein the instructions are further executable to:
    start a system information timer; and
    refresh select system information from the available cell each time the system information timer expires.

18. The apparatus of claim 17, wherein the system information timer is a 30 second Third Generation Partnership Project timer.

19. The apparatus of claim 17, wherein refreshing the select system information ensures that cell selection parameters have not changed.

20. The apparatus of claim 11, wherein monitoring the synchronization channel allows the apparatus to initiate emergency calls.

21. An apparatus for operating in a limited service state, comprising:
    means for determining that the apparatus is in the limited service state;
    means for camping on an available cell in response to the limited service state determination; and
    means for monitoring a synchronization channel from the available cell at a reduced rate than a rate used for a full service state.

22. The apparatus of claim 21, wherein the synchronization channel is a Global Systems for Mobile Communications SCH channel.

23. The apparatus of claim 21, wherein the apparatus refrains from monitoring a paging channel while in the limited service state.

24. The apparatus of claim 21, wherein the reduced rate is based on a battery power level of the apparatus.

25. The apparatus of claim 21, wherein the reduced rate is based on a network of the available cell.

26. A non-transitory computer-readable medium having instructions thereon, the instructions comprising:
    code for causing a wireless communication device to determine that the wireless communication device is in a limited service state;
    code for causing the wireless communication device to camp on an available cell in response to the limited service state determination; and
    code for causing the wireless communication device to monitor a synchronization channel from the available cell at a reduced rate than a rate used for a full service state.

27. The computer-readable medium of claim 26, wherein the synchronization channel is a Global Systems for Mobile Communications SCH channel.

28. The computer-readable medium of claim 26, wherein the wireless communication device refrains from monitoring a paging channel while in the limited service state.

29. The computer-readable medium of claim 26, wherein the reduced rate is based on a battery power level of the wireless communication device.

30. The computer-readable medium of claim 26, wherein the reduced rate is based on a network of the available cell.

* * * * *